July 12, 1932.  F. D. DURHAM  1,866,967
SHAFT PACKING
Filed Oct. 4, 1930  3 Sheets-Sheet 1

INVENTOR.
Fred D. Durham,
BY
ATTORNEY.

July 12, 1932.  F. D. DURHAM  1,866,967
SHAFT PACKING
Filed Oct. 4, 1930  3 Sheets-Sheet 2
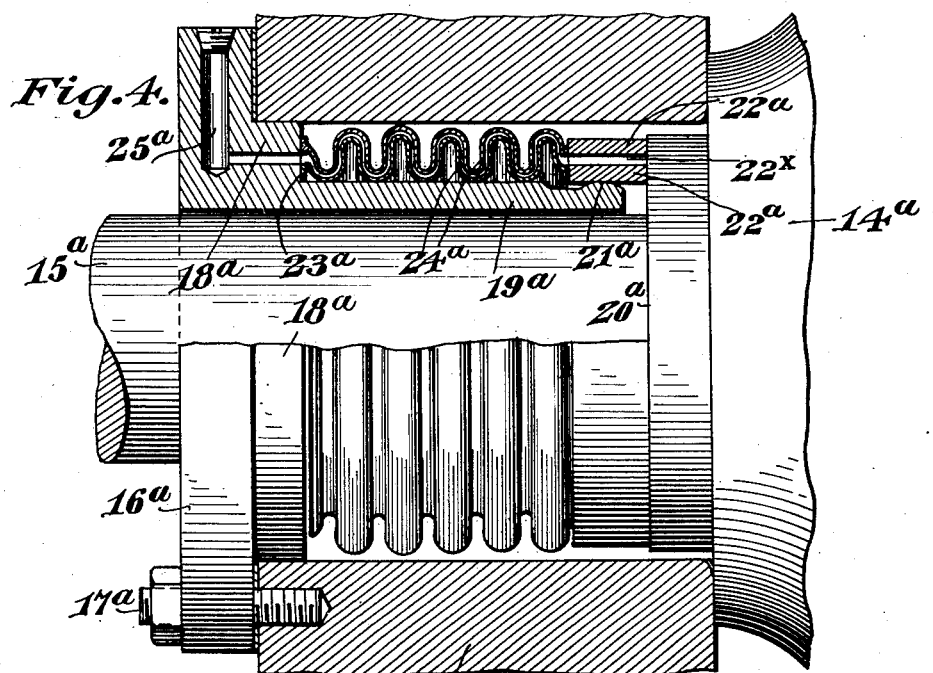
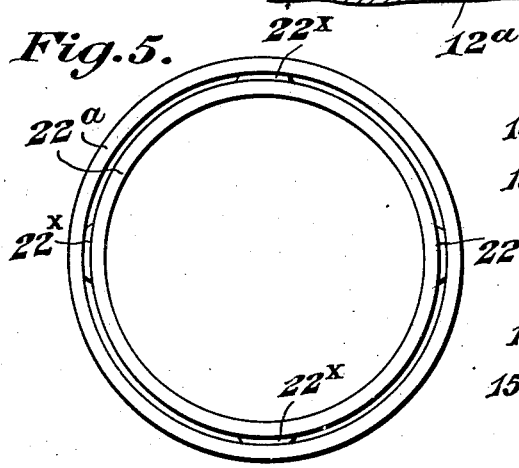
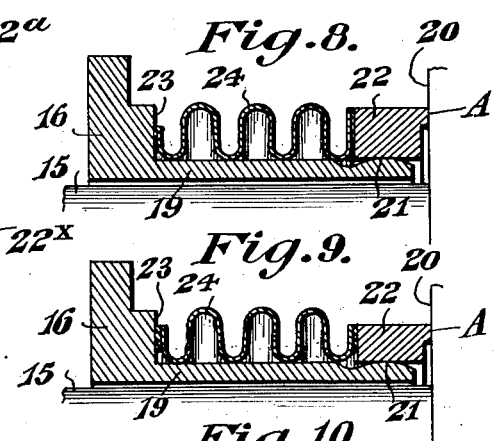
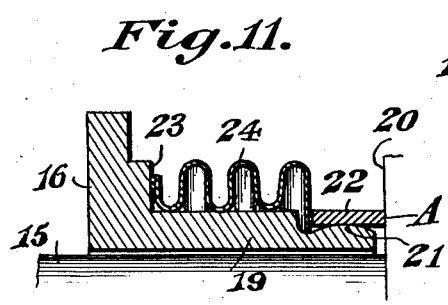
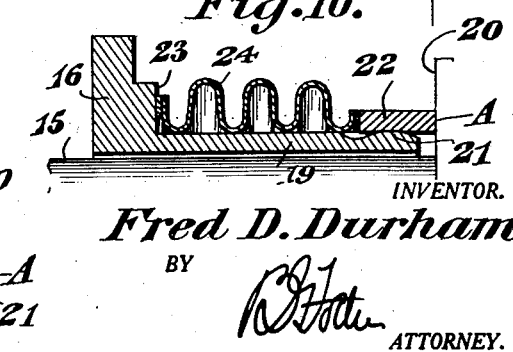
INVENTOR.
Fred D. Durham,
BY
ATTORNEY.

July 12, 1932.  F. D. DURHAM  1,866,967
SHAFT PACKING
Filed Oct. 4, 1930   3 Sheets-Sheet 3
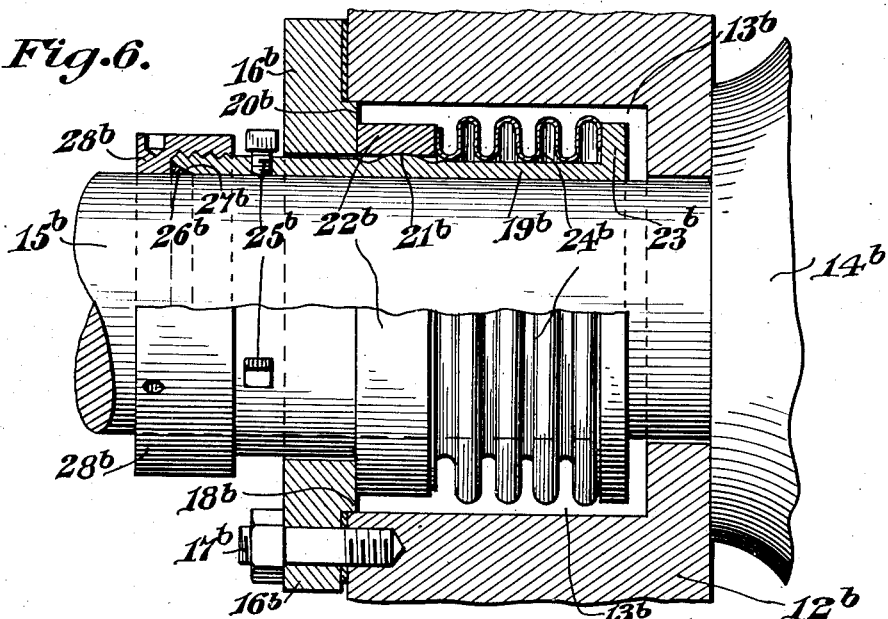
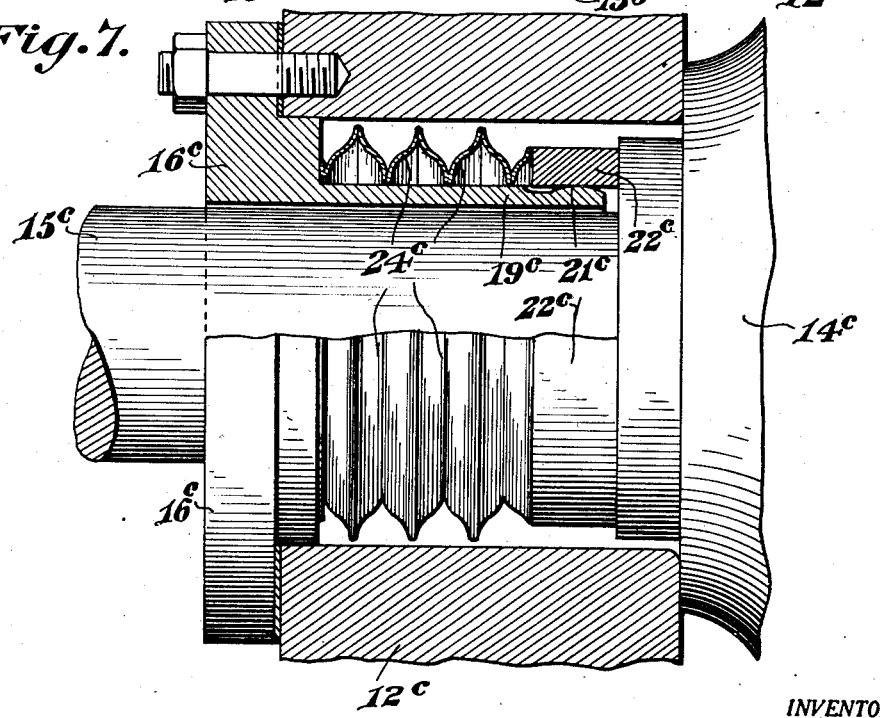
INVENTOR.
Fred D. Durham,
BY
ATTORNEY.

Patented July 12, 1932

1,866,967

UNITED STATES PATENT OFFICE

FRED D. DURHAM, OF LOUISVILLE, KENTUCKY, ASSIGNOR TO C. LEE COOK MANUFACTURING COMPANY, OF LOUISVILLE, KENTUCKY, A CORPORATION OF KENTUCKY

SHAFT PACKING

Application filed October 4, 1930. Serial No. 486,493.

The object of the present invention is to provide a simple and effective packing in which the element that has a movable bearing at the joint, is capable of vibratory or gyratory movement, so that it can maintain its packing engagement irrespective of any inaccuracy of the part that it bears against.

Another and important object is to provide a structure that constitutes a unit and can be introduced and removed from the journal box without the necessity of being dismembered.

The invention may take various forms, and in the accompanying drawings several embodiments are illustrated, wherein:—

Figure 4 is a view partly in elevation and partly in section of another embodiment of the invention.

Figure 5 is an end view of the packing washer.

Figure 6 is a view partly in elevation and partly in section of still another form of construction.

Figure 7 is a view similar to Figure 1, but showing a modified form of bellows.

Figures 8, 9, 10 and 11 are detail sectional views illustrating modified forms of bearing rings by which different contact pressures may be obtained.

Figure 1:
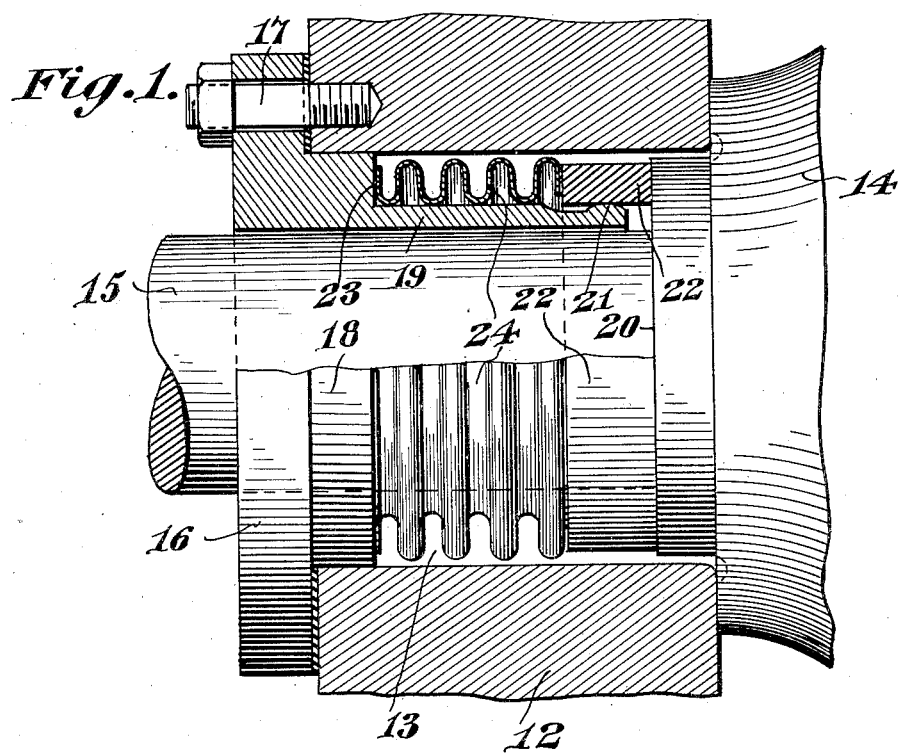
Figure 1 is a view partly in elevation and partly in section of one form of construction.
Figure 2:
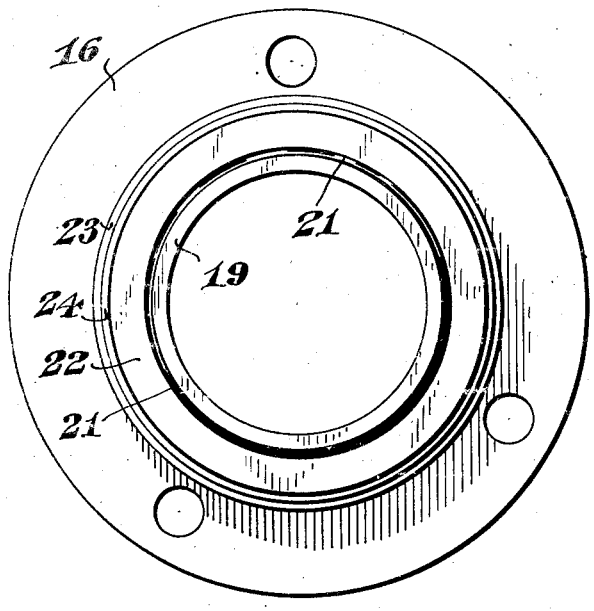
Figure 2 is an end elevation of the packing member per se.
Figure 3:
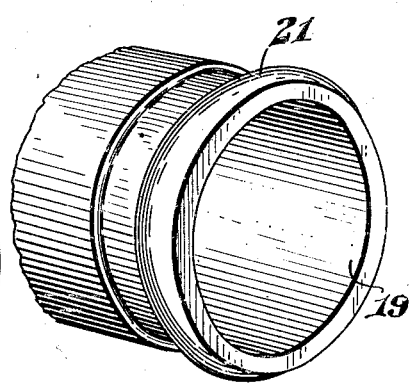
Figure 3 is a detail perspective view of the bearing end of the carrier sleeve.

Referring first to the embodiment disclosed in Figures 1, 2 and 3, a journal box member 12 is provided which is chambered, as shown at 13. A rotary member 14 is provided with a shaft member 15 that extends through the chamber 13 of the journal box member 12. In order to prevent the escape of fluid from the interior of the member 12 and along the shaft 15, the following mechanism is provided.

A head 16 is bolted, as shown at 17, to the exterior of the member 12, and has a hub portion 18 fitted into the outer end of the chamber 13. Extending inwardly from the said hub portion 18 is a carrier sleeve 19 that surrounds the shaft 15, and preferably terminates short of a bearing shoulder 20 formed on the member 14 and located within the said chamber 13. The inner end of the sleeve 19 has an annular transversely rounded bead 21.

Mounted on the inner end of the sleeve 19 and having a bearing on said bead 21 is a packing washer 22 that bears against the shoulder 20. Surrounding the sleeve 19 and interposed between the outer end of the washer 22 and the shoulder 23 formed by the inner end of the hub 18, is a cylindrical bellows 24 suitably attached at its ends to said washer 22 and to the shoulder 23.

Inasmuch as the washer 22 has a surface bearing against the shoulder 20 and the bellows is attached to said washer and to the head 18 of the carrier sleeve, the joint or bearing is completely packed. Moreover inasmuch as the washer 22 is supported on the rounded bead 21, it is free to vibrate or gyrate so that any inaccuracy in the shoulder 20 is accommodated and yet a tight bearing is maintained. It will be noted that the parts constitute a unit which can be inserted in the chamber 13 or removed therefrom without dismemberment.

In Figure 4 a structure is provided which affords means for lubricating the bearing between the packing washer and the face with which it contacts. In this structure the journal box member is designated 12a and the rotary member 14a. The latter is provided with the shaft 15a. A head 16a, bolted as shown at 17a to the member 12a, is provided with a hub 18a extending into the chamber 13a of the member 12a. Projecting from the hub 18a is a bearing sleeve 19a terminating short of the bearing shoulder 20a of the member 14a. This inner end of the sleeve has the annular transversely rounded bearing rib 21a on which is mounted a packing washer. This washer consists of circular inner and outer portions or sections 22a separated by spacing ribs 22x. Interposed between this washer and the shoulder 23a formed by the inner end of the hub 18a are nested cylindrical bellows 24a, the outer ends of which are suitably attached to the shoulder 23a and their rear ends being respectively attached to the inner and outer sections 22a of the packing ring. A lubricant-conducting passageway 25a, formed in the upper portion of the head 16a communicates with the space between the outer ends of the bellows 24a. A passageway for lubricant is thus formed from the upper end of the head to the inner face of the packing washer so that lubricant introduced at 25a will find its way to the bearing.

Referring now to Figure 6 a reversed structure to that shown in Figure 1 is illustrated. The journal box member is here designated 12b and is provided with a chamber 13b. The rotary member is designated 14b and is provided with a shaft 15b that projects through the chamber 13b. A head 16b is bolted, as shown at 17b to the member 12b and has a hub 18b extending into the outer end of the chamber 13b. A sleeve 19b is mounted on the shaft and extends through the head 16b. In this instance, the inner end of the hub 18b of the head 16b constitutes a bearing face 20b, and the sleeve just inside face 20b has an annular transversely rounded bearing bead 21b. On this bead is mounted a packing washer 22b that contacts with the face 20b. The inner end of the sleeve 19b has an annular peripheral flange 23b, and attached to said flange is the bellows 24b that extends across the space between such flange 23b and the washer 22b and is attached to the latter.

In this form of construction, it will be noted that the packing is against the head 16b and that the sleeve 19b rotates with the shaft. As a consequence it may be fastened thereto by any suitable means, as for example, set screws 25b. Moreover in order to prevent any leakage between the sleeve and the shaft, packing 26b is preferably located in an annular channel 27b formed in the outer end of the sleeve and covered and compressed by a cap 28b threaded on said sleeve.

In Figure 7 the structure is substantially the same as that illustrated in Figure 1, except that a different form of bellows is illustrated. In Figure 1 the bellows is formed of a single piece of material bent or collapsed into bellows form. In Figure 7 the bellows is shown as made up of sections secured together. In this form the journal box member is designated 12c and the rotary member 14c. The shaft is shown at 15c. The head is illustrated at 16c and has the carrier sleeve 19c with its bearing rib 21c. The packing washer is shown at 22c and the bellows is formed of cupped sections 24c joined together at their inner edges and at their outer edges respectively. The action is of course the same as in Figure 1.

In Figures 8, 9, 10 and 11, there is illustrated the means by which various pressures of the packing ring against the bearing face can be obtained. Thus in Figure 8, assuming that the pressure against the ring 22 is 100 pounds to the square inch and the entire width of the packing ring 22 is three-quarters of an inch, while the bearing portion indicated at A, is cut down to one-quarter of an inch, each inch of perimeter of the ring will operate against the shoulder 20 with 300 pounds pressure, plus of course the natural tension of the elastic bellows. In Figure 9 the outer diameter of the ring 22 is shown as reduced, cutting down the contact pressure at A to 200 pounds. In Figure 10 the diameter of the ring is reduced so that under the above conditions the pressure at A is but 100 pounds, while in Figure 11 the arrangement is such that the pressure is completely balanced and the spring tension only of the bellows operates against the packing ring.

From the foregoing, it is thought that the construction, operation and many advantages of the herein described invention will be apparent to those skilled in the art without further description, and it will be understood that various changes in the size, shape, proportion and minor details of construction may be resorted to without departing from the spirit or sacrificing any of the advantages of the invention.

What I claim, is:

1. The combination with relatively rotatable members having a joint to be packed, one of said members being a shaft, of a carrier sleeve on the shaft, a packing washer having a bearing on the sleeve and engaging the other member, and a bellows interposed between the sleeve and washer.

2. The combination with relatively rotatable members having a joint to be packed, one of said members being a shaft, of a carrier sleeve on the shaft, a packing washer having a bearing on the sleeve and engaging the other member, and a bellows interposed between a portion of the sleeve and the washer and surrounding the sleeve.

3. The combination with relatively rotatable members having a joint to be packed, of a carrier element mounted on one member, a packing washer surrounding and having a bearing on the carrier element that permits it to swing and also having a bearing against the other member, and a bellows element connecting the two elements.

4. The combination with a journal box member and a shaft member, of a carrier sleeve surrounding the shaft member, a packing washer surrounding and having a bearing on the sleeve that permits it to gyrate and having a bearing against one of the members, and a bellows associated with the sleeve.

5. The combination with a journal box member and a shaft member, of a carrier sleeve surrounding the shaft member and having a shoulder at one end and an annular transversely rounded bearing at its other end, a packing washer mounted on said bearing, and yielding means interposed between the shoulder and the washer.

6. The combination with a journal box member and a shaft member, of a carrier sleeve surrounding the shaft member and having a shoulder at one end and an annular transversely rounded bearing at its other end, a packing washer mounted on said bearing, and an extensible bellows surrounding the sleeve and interposed between the shoulder and the washer.

7. The combination with a journal box member having a chamber and a shaft member extending into the chamber, of a shouldered sleeve surrounding the shaft member in the chamber and having a rounded rib, a packing washer on the rib bearing against one of the members, and a bellows interposed between the shoulder of the rib and the packing washer.

8. The combination with a journal box member having a chamber and a shaft member extending into the chamber, of a shouldered sleeve secured to the journal box member and surrounding the shaft member in the chamber and having a rounded rib on its inner end, a packing washer on the rib bearing against one of the members, and a bellows interposed between the shoulder of the rib and the packing washer.

9. The combination with relatively rotatable members having a joint to be packed, of a packing washer mounted on one member and having a bearing against the other, a plurality of bellows associated with the packing washer, and means for directing lubricant between the bellows to the bearing of the packing washer.

10. The combination with a journal box member and a shaft member journaled therein, of a sleeve on the shaft within the journal box member and having a shoulder and a bearing portion, a packing washer on the bearing portion bearing against one of the members, nested bellows on the shaft interposed between the washer and the shoulder, said washer having a passageway leading from the space between the bellows, and means for supplying lubricant to said space.

11. The combination with a journal box member having a chamber and a head for the chamber, of a shaft member journaled in the chamber, a sleeve fixed to the shaft and having a shoulder at the end remote from the head and a bearing portion adjacent said head, a packing washer on the bearing portion and operating against the head, and a yielding member interposed between the shoulder and the washer.

12. The combination with a journal box member having a chamber and a head for the chamber, of a shaft member journaled in the chamber, a sleeve fixed to the shaft and having a shoulder at the end remote from the head and a bearing portion adjacent said head, a packing washer on the bearing portion and operating against the head, and a bellows surrounding the sleeve and interposed between the shoulder and the washer.

13. The combination with relatively rotatable members having a joint to be packed, one of said members having a bearing face, a packing washer surrounding and carried by the other member and having a packing face engaged with the first face and rotatable thereagainst, a bearing for the packing washer on the member carrying it and permitting the washer to swing transversely to the coacting faces and maintain bearing contact notwithstanding inequalities of the structure, and a bellows connecting the washer and the member carrying it.

In testimony whereof, I affix my signature.

FRED D. DURHAM.